E. T. GILLILAND.
Magneto Electric Generators for Telephone Call Signals.
No. 230,264. Patented July 20, 1880.
2 Sheets—Sheet 1.
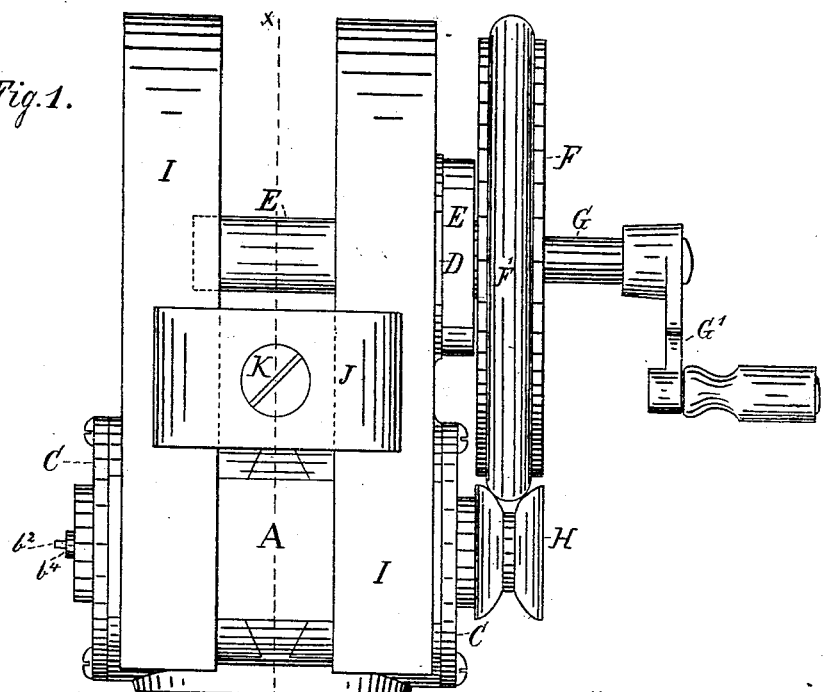
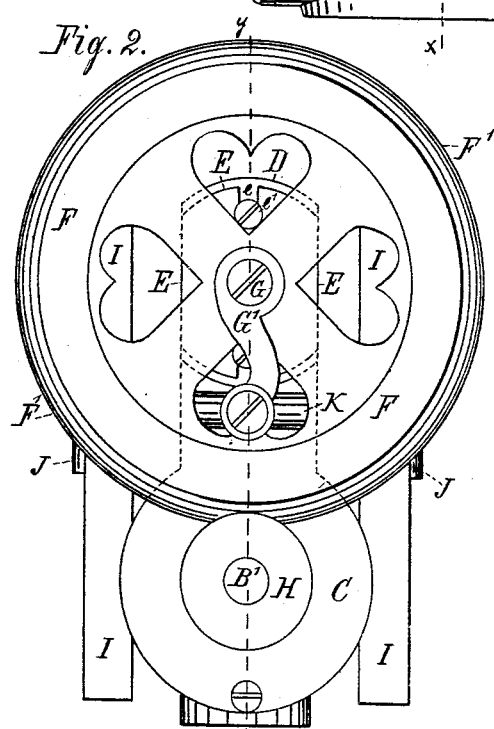
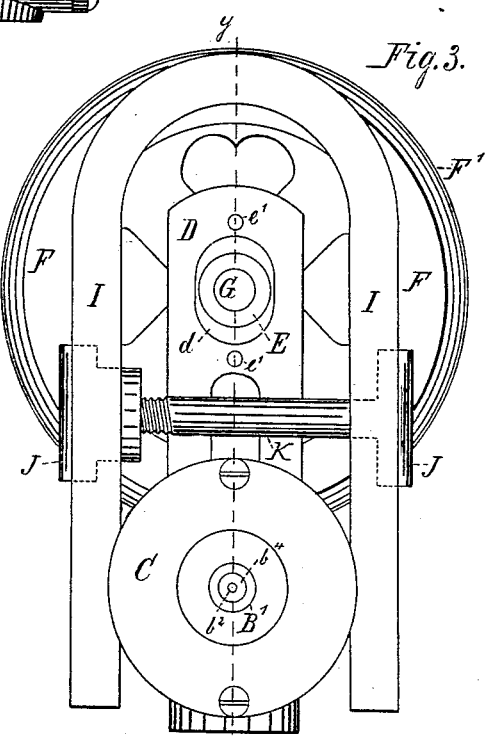
WITNESSES.
James B. Lizius.
R. P. Daggett.
INVENTOR.
Ezra T. Gilliland,
PER
C. Bradford
ATTORNEY.

2 Sheets—Sheet 2.
E. T. GILLILAND.
Magneto Electric Generators for Telephone Call Signals.
No. 230,264. Patented July 20, 1880.
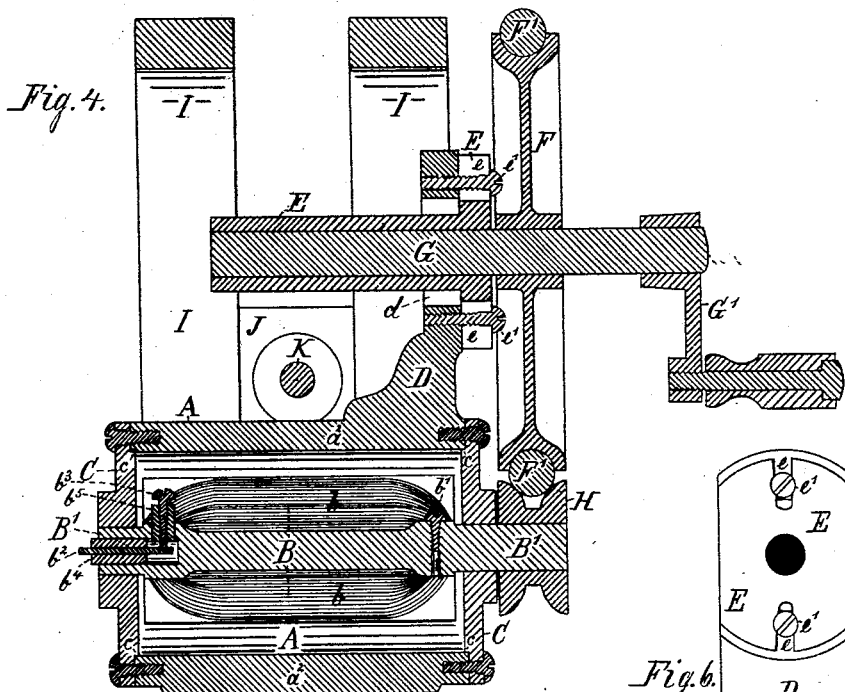
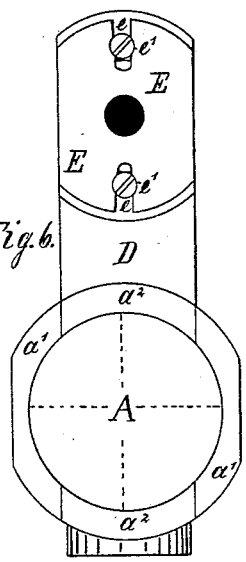
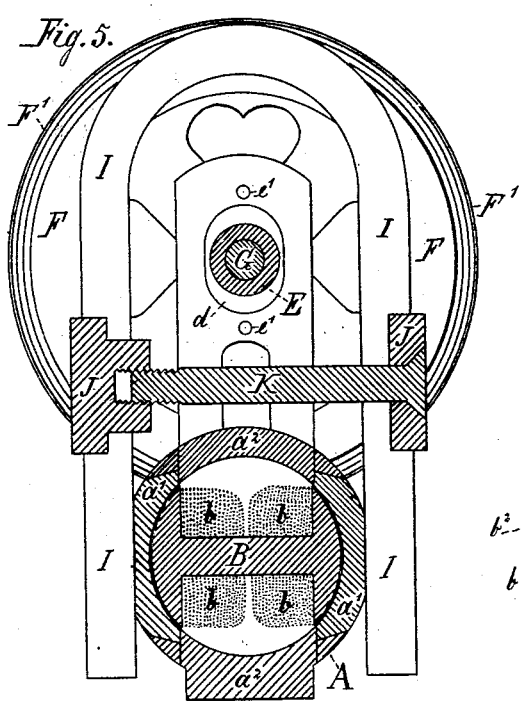
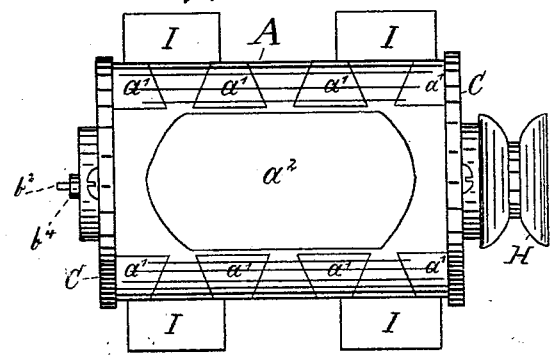
WITNESSES. INVENTOR.
James B. Lizius. Ezra T. Gilliland,
R. P. Daggett PER C. Bradford, ATTORNEY.

UNITED STATES PATENT OFFICE.

EZRA T. GILLILAND, OF INDIANAPOLIS, INDIANA, ASSIGNOR OF SIX-NINTHS OF HIS RIGHT TO WILLIAM H. MORRISON, WILLIAM O. ROCKWOOD, AND CHARLES B. ROCKWOOD, TWO-NINTHS TO EACH, ALL OF SAME PLACE, AND SAID GILLILAND, MORRISON, AND C. B. ROCKWOOD AND HELEN M. ROCKWOOD AND C. B. PARKHAM, ADMINISTRATORS OF W. O. ROCKWOOD, DECEASED, ASSIGNORS TO GILLILAND ELECTRIC MANUFACTURING COMPANY, OF SAME PLACE.

MAGNETO-ELECTRIC GENERATOR FOR TELEPHONE CALL-SIGNALS.

SPECIFICATION forming part of Letters Patent No. 230,264, dated July 20, 1880.

Application filed July 8, 1879.

*To all whom it may concern:*

Be it known that I, EZRA T. GILLILAND, of the city of Indianapolis, county of Marion, and State of Indiana, have invented certain new and useful Improvements in Magneto-Electric Generators for Telephone Call-Signals, of which the following is a specification, reference being had to the accompanying drawings, which are made part hereof, and on which similar letters of reference indicate similar parts.

Figure 1 is a side elevation of my improved generator. Fig. 2 is an elevation of one end thereof. Fig. 3 is an elevation of the other end. Fig. 4 is a longitudinal vertical section on the dotted line $xx$. Fig. 5 is a transverse vertical section on the dotted line $yy$. Fig. 6 is an end elevation of the casting forming the cylinder and shaft-bearing support, with the shaft-bearing attached thereto, but separate from the remainder of the generator. Fig. 7 is a plan view of the bottom of the cylinder and adjacent parts, particularly showing how the metals are dovetailed together.

In said drawings, the portion marked A represents a cylinder containing the armature, and consisting of two iron pole-pieces, $a'$ $a'$, divided by the brass portions $a^2 a^2$; B, a revolving armature, generally known as the "Siemens" armature, and which, to persons skilled in the art, will need no further explanation; C C, brass disks which constitute the heads to the cylinder A and bearings for the shaft B' of the revolving armature B; D, a standard projecting upwardly from the cylinder A, and cast thereon, to form a support for the bearing for the driving-wheel; E, an adjustable bearing secured to the face of the standard D, through an opening in which the longer portion of the bearing projects and in which the shaft of the driving-wheel runs. This bearing is made adjustable by means of the slots $e$ $e$, through which the supporting-screws $e'$ $e'$ pass, and the elongated opening $d$ in the standard, in the manner best shown in Fig. 4.

F is a driving-wheel mounted on the shaft G, and which drives the wheel H on the shaft B', and thereby the armature. It is preferable that friction be employed as the means by which the simultaneous rotation of these wheels is secured, on account of its comparative noiselessness, instead of gear-wheels. A cylindrical rubber band, F', is therefore placed upon the wheel F, and the bearing E being properly adjusted secures the desired result.

I I are ordinary magnets, which are secured together and to the pole-pieces of the cylinder by the brass clamps J J and the bolt K.

G' is a crank by which the mechanism is operated.

The object of my invention is to produce a magneto-electric generator, the mechanical construction of which shall be such as to insure that the shafts shall be in line, that the armature-shaft shall be accurately centered in relation to the cylinder, and that the cylinder, while more accurately fitted than heretofore, shall be more simple and less expensive.

To attain these objects I first provide a solid composite cylinder, composed of iron pole-pieces and brass portions, which connect them together. In the present application this is shown in the form of a solid casting, which is made by first forming the iron pole-pieces with dovetailed or other suitable shaped interstices therein, and placing them in the proper position in the molds, when the brass, being cast into said molds, runs into these interstices as well, and thus makes each cylinder, mechanically speaking, in effect a single casting. This form of constructing the cylinders is, however, no part of my invention, and I disclaim it.

As a matter of convenience and economy, I also include the upwardly-projecting standard which supports the bearing for the driving-wheel in the same casting.

The above-described method of casting the cylinder provides for pole-pieces of magnetic metal, and for connecting portions which shall be non-magnetic, as is well known is necessary in a machine of this description.

After the cylinder is bored out it is placed on a mandrel and the bearing-face of the standard and the ends of the cylinder faced off at the same operation, thus insuring perfect accuracy correlatively.

The disks C C are faced and bored and the shoulders $c\,c$ turned thereon without being removed from the lathe, and thus a perfectly centered bearing for the armature-shaft is formed. By reason of this extra accurate fitting, and the certainty of exact centering attained thereby, the armature (the shaft-bearings of which are also turned at the same time as the outer surfaces thereof) may be made to run within one one-hundred-and-twentieth of an inch of the pole-pieces—a very desirable result, and one which has not heretofore been attained.

The helix $b$ is connected directly to the shaft at one end by the screw $b'$, and at the other to the insulated pin $b^2$ by the insulated screw $b^3$, $b^4$ $b^5$ being rubber or other suitable insulators.

The circuit is formed by making a spring or other suitable connection with the insulated pin $b^2$ with one wire, and a second attachment to some other part of the machine with the other wire, all in the ordinary manner. The turning of the crank $G'$ serves, through the other mechanism, to actuate the armature, and thus generate the electric current, which, by proper connections, is made to ring a bell or operate such call-signal as is used at the other end of the line.

Other points, which are in a measure shown, and might have been described and claimed herein, are expressly reserved as the subject-matter of other Letters Patent, for which I intend shortly to apply.

Having thus fully described my said invention, what I claim as new, and desire to secure by Letters Patent, is—

1. In a magneto-electric generator, the combination, with the cylinder A and the armature-shaft $B'$, of the cylinder-heads C C, said heads being bored in the center to form bearings for said shaft, and having shoulders $c\,c$ turned thereon to engage with the ends of the cylinder, which shoulders, being equidistant on all sides from the bores forming the shaft-bearings, insure an accurate centering of said shaft in said cylinder, and thus reduce the space between the armature and the pole-pieces to a minimum, substantially as herein shown and specified.

2. In a magneto-electric generator having a rotary armature, the combination, in a single casting, of the cylinder A for the armature and the standard D as a bearing-support for the shaft of the drive-wheel, substantially as shown and specified.

In witness whereof I have hereunto set my hand and seal at Indianapolis, Indiana, this 19th day of June, A. D. 1879.

EZRA T. GILLILAND. [L. S.]

In presence of—
 C. BRADFORD,
 CHAS. B. ROCKWOOD.